US011168172B2

(12) United States Patent
Hahn et al.

(10) Patent No.: US 11,168,172 B2
(45) Date of Patent: Nov. 9, 2021

(54) POLYURETHANE FOAM AND PROCESS FOR PRODUCING SAME

(71) Applicant: Covestro Deutschland AG, Leverkusen (DE)

(72) Inventors: Christian Hahn, Leverkusen (DE); Reinhard Albers, Leverkusen (DE); Ali-Kasim Anwar, Essen (DE); Paul Heinz, Leverkusen (DE); Michael Baecker, Korschenbroich (DE); Marcel Schornstein, Neuss (DE)

(73) Assignee: Covestro Deutschland AG, Leverkusen (DE)

( * ) Notice: Subject to any disclaimer, the term of this patent is extended or adjusted under 35 U.S.C. 154(b) by 107 days.

(21) Appl. No.: 16/490,732

(22) PCT Filed: Mar. 5, 2018

(86) PCT No.: PCT/EP2018/055271
§ 371 (c)(1),
(2) Date: Sep. 3, 2019

(87) PCT Pub. No.: WO2018/162372
PCT Pub. Date: Sep. 13, 2018

(65) Prior Publication Data
US 2020/0017624 A1 Jan. 16, 2020

(30) Foreign Application Priority Data

Mar. 7, 2017 (EP) .................................... 17159555

(51) Int. Cl.
*C08G 18/48* (2006.01)
*C08G 18/18* (2006.01)
*B29C 44/10* (2006.01)
*C08G 18/76* (2006.01)
*C08J 9/12* (2006.01)
*F16L 59/02* (2006.01)
*B29C 41/00* (2006.01)
*B29C 45/00* (2006.01)
(Continued)

(52) U.S. Cl.
CPC ........ *C08G 18/1841* (2013.01); *B29C 41/003* (2013.01); *B29C 44/10* (2013.01); *B29C 45/0001* (2013.01); *C08G 18/1825* (2013.01); *C08G 18/485* (2013.01); *C08G 18/4816* (2013.01); *C08G 18/4829* (2013.01); *C08G 18/4845* (2013.01); *C08G 18/4854* (2013.01); *C08G 18/7664* (2013.01); *C08J 9/122* (2013.01); *C08J 9/142* (2013.01); *F16L 59/028* (2013.01); *F25D 23/064* (2013.01); *F25D 23/066* (2013.01); *B29K 2075/00* (2013.01); *B29K 2105/0014* (2013.01); *B29K 2105/045* (2013.01); *B29K 2995/0063* (2013.01); *B29L 2031/7622* (2013.01); *C08G 2110/005* (2021.01); *C08G 2110/0025* (2021.01); *C08G 2110/0058* (2021.01); *C08G 2110/0066* (2021.01); *C08J 2203/06* (2013.01); *C08J 2203/08* (2013.01); *C08J 2203/12* (2013.01); *C08J 2205/044* (2013.01); *C08J 2205/05* (2013.01); *C08J 2205/10* (2013.01); *C08J 2375/08* (2013.01)

(58) Field of Classification Search
CPC ... B29C 41/003; B29C 44/10; B29C 45/0001; B29K 2075/00; B29K 2105/0005; B29K 2105/0014; B29K 2105/041; B29K 2105/045; B29K 2995/0063; B29L 2031/7622; C08G 18/1825; C08G 18/1841; C08G 18/3206; C08G 18/4816; C08G 18/4825; C08G 18/4829; C08G 18/4841; C08G 18/4845; C08G 18/485; C08G 18/4854; C08G 18/6677; C08G 18/7664; C08G 2101/00; C08G 2110/0025; C08G 2110/005; C08G 2110/0058; C08G 2110/0066; C08G 2330/50; C08J 9/0004; C08J 9/122; C08J 9/141; C08J 9/142; C08J 2201/022; C08J 2203/06; C08J 2203/08; C08J 2203/12; C08J 2205/044; C08J 2205/05; C08J 2205/10; C08J 2207/00; C08J 2375/08; F16L 59/028; F25D 23/064; F25D 23/066
See application file for complete search history.

(56) References Cited

U.S. PATENT DOCUMENTS 4,906,672 A * 3/1990 Stone ...................... C08J 9/122
264/50
5,880,168 A 3/1999 Heinz et al.
(Continued)

FOREIGN PATENT DOCUMENTS

EP 2910585 A 8/2015

OTHER PUBLICATIONS

Ionescu, Chemistry and Technology of Polyols for Polyurethanes, 2005, Shawbury, Chapter 4 p. 55 et seq.; Chapter 8 p. 263 et seq.; Chapter 13 p. 321 et seq.; and Chapter 16 p. 419 et seq.
(Continued)

Primary Examiner — John M Cooney
(74) Attorney, Agent, or Firm — Donald R. Palladino; N. Denise Brown; Jed C. Benson

(57) ABSTRACT

The invention relates to a process used to produce open-cell and extremely fine-cell PUR/PIR rigid foams, said process using a polyol formulation comprising a specific isocyanate-reactive component, a catalyst component having zerewitinoff-active hydrogens and a cell-opener component.

14 Claims, No Drawings

(51) Int. Cl.
*C08J 9/14* (2006.01)
*F25D 23/06* (2006.01)
*B29K 75/00* (2006.01)
*B29L 31/00* (2006.01)
*B29K 105/00* (2006.01)
*B29K 105/04* (2006.01)

(56) References Cited

U.S. PATENT DOCUMENTS

| | | |
|---|---|---|
| 5,916,480 A | 6/1999 | Rotermund et al. |
| 9,139,683 B2 | 9/2015 | Lindner et al. |
| 9,834,655 B2 | 12/2017 | Steinmeister et al. |
| 2003/0065045 A1* | 4/2003 | Falke .................. C08G 18/482 521/155 |
| 2003/0144368 A1 | 7/2003 | Sulzbach et al. |
| 2003/0204042 A1 | 10/2003 | Moethrath et al. |
| 2008/0114086 A1 | 5/2008 | Lorenz et al. |
| 2011/0201716 A1 | 8/2011 | Gehinger et al. |
| 2012/0245243 A1 | 9/2012 | Lindner et al. |
| 2012/0251727 A1* | 10/2012 | Shimizu ............. C08G 18/4841 427/373 |
| 2014/0045960 A1 | 2/2014 | Lindner et al. |
| 2014/0234613 A1* | 8/2014 | Nefzger ............. C08G 18/4895 428/319.1 |
| 2015/0232629 A1 | 8/2015 | Lindner et al. |
| 2016/0333160 A1 | 11/2016 | Bertucelli et al. |

OTHER PUBLICATIONS

Verlag, Carl Hanser, Polyurethane, vol. 7, 3rd edition, p. 104-127, 1993, Munich/Vienna.
International Search Report—PCT/EP2018/055271; dated May 24, 2018.; authorized officer: Ralf Buestrich.

* cited by examiner

POLYURETHANE FOAM AND PROCESS FOR PRODUCING SAME

CROSS-REFERENCE TO RELATED APPLICATION

This application is a national stage application under 35 U.S.C. § 371 of PCT/EP2018/055271, filed Mar. 5, 2018, which claims the benefit of European Application No. 17159555.6, filed Mar. 7, 2017, each of which is incorporated herein by reference.

FIELD

The present invention relates to a process for producing a rigid open-celled polyurethane foam. In addition to urethane groups (PUR) the foams may also contain isocyanurate groups (PIR). In the present application unless otherwise stated the description rigid PUR/PIR foam is to be understood as meaning not only rigid foams comprising substantially urethane groups but also rigid foams containing both urethane groups and isocyanurate groups.

BACKGROUND

Rigid PUR/PIR foams have long been known. Thermal insulation is a substantial area of application. The use of vacuum insulation panels (VIP) containing rigid PUR/PIR foams for insulation is increasing in importance. Foam quality has a decisive influence on the insulation properties of foams used for vacuum insulation: on the one hand a very small cell size and very homogeneous cell sizes are advantageous and on the other hand a high proportion of open cells is advantageous to allow the foam to be readily evacuated.

EP 905 159 A and EP 905 158 A disclose processes for producing open-celled rigid polyurethane foams which preferably employ water in combination with hydrocarbons or hydrofluorocarbons as a blowing agent. The polyol formulations are said to contain 0.1-80% by weight of polyester alcohols which are preferably reaction products of ricinoleic acid and/or castor oil and/or tall oil fatty acid with polyfunctional alcohols. These components are said to act as emulsifiers for non-halogenated blowing agents. In the examples the claimed polyols are used to produce both open-celled and closed-celled foams, wherein the open-cell content is dependent on the presence of additives known as cell openers. While the cells of the obtained foams are described as fine-celled, according to the legend "very fine-celled" is to be understood as meaning a cell size range of 180-250 µm. In addition, nothing is said about the homogeneity of the cell size distribution.

In the production of rigid PUR/PIR foams a polyol component also containing a blowing agent is reacted with an isocyanate. The reaction of isocyanate with water forms carbon dioxide, which also acts as a blowing agent. It is also known to add $CO_2$ to the polyol component or to the reaction mixture as a blowing agent.

The abrupt decompression of $CO_2$-containing reaction mixtures is described in WO 2001/98389 A1. This patent application relates to a process for producing slabstock polyurethane foam, wherein a carbon dioxide-containing polyurethane reactive mixture is suddenly decompressed from a pressure above the equilibrium solution pressure of the carbon dioxide to standard pressure. The liquid polyurethane reactive mixture is foamed by the liberation of dissolved carbon dioxide and the foamed mixture is applied to a substrate and subsequently cured to afford slabstock foam. The carbon dioxide is initially fully dissolved in the reactive mixture or at least one of the components polyol and isocyanate at a pressure substantially above the equilibrium solution pressure.

Subsequently the pressure is reduced to a pressure close to the equilibrium solution pressure, wherein the pressure is temporarily reduced below the equilibrium solution pressure to liberate small amounts of the carbon dioxide by forming a bubble microdispersion, the components are optionally mixed and the sudden pressure reduction to standard pressure is performed before the liberated carbon dioxide fully redissolves. However, no information about nanocellular foams or supercritical conditions for the blowing agent may be found here.

WO 2011/054868 A and WO 2011/054873 A disclose production processes for fine-celled urethane-containing foams using $CO_2$ as a supercritical blowing agent. The production of a microemulsion from the polyol phase and supercritical $CO_2$ is decisive for the success of the process in both cases. Said microemulsion is to be established through the use of suitable surfactant components. However, there is no indication of how this process is used to produce foams having predominantly open cells.

WO 2015/109488 A likewise describes a production process for urethane-containing foams using $CO_2$ as a supercritical blowing agent. The production process is a multistage process, wherein the polyol component must initially be saturated with $CO_2$ under supercritical conditions before the reaction mixture is subsequently subjected to pressures of at least 100 bar. The produced foams are said to have small cell sizes and a high porosity. However, foams having a high open-cell content are found only when using propylene oxide-based polyethers and when using two very specific cell-opening surfactants in a particular ratio. The process provides foams having densities >>100 kg/m³. The total duration for the multistage process (saturation, reaction, curing) in the reactor is >>1 h during which time supercritical conditions must be maintained.

SUMMARY

Proceeding from the present prior art the present invention therefore had for its object to provide a polyol formulation for a reaction mixture with which a very fine-celled, open-celled urethane-containing rigid foam (rigid PUR/PIR foam) may be produced in a simple process for producing very fine-celled, urethane-containing rigid foams having a high open-cell content which overcomes the disadvantages of the prior art. A very high open-cell content combined with a small cell size is of interest for certain applications where this foam property makes it possible to reduce the thermal conductivity of the foam by application of negative pressure.

To be provided in particular are a polyol formulation and a process with which it is possible to produce provide rigid polyurethane foams having an apparent density of 30-90 kg/m³ and an open-cell content of >90% and where the cells have an average diameter of <50 µm.

The present invention provides a process for producing rigid PUR/PIR foams having an apparent density of 30-90 kg/m³ according to ISO 845:2006, preferably 30-70 kg/m³, an open-cell content of >90% according to ISO 4590:2002, preferably >94%, and having an average cell diameter of <50 µm according to optical microscopy evaluation, comprising the steps of i) producing a foam-forming reaction mixture R) containing the polyol formulation P) containing
an isocyanate-reactive component A) comprising
at least one polyol component A1) having a functionality f of >2.5 which is selected from the group consisting of polyether polyols, polyester polyols, polycarbonate polyols, polyether polycarbonate polyols and polyether ester polyols,
a catalyst component D) at least containing a catalytically active compound D1) having Zerewitinoff-active hydrogens,
assistant and additive substances E) at least comprising a cell-opening compound,
wherein the proportion of all primary OH functions present in the isocyanate-reactive component A) based on the total number of terminal OH functions in the component A) is at least 30%,
a polyisocyanate component B) and
$CO_2$ in the supercritical state as blowing agent component C),
ii) introducing the foam-forming reaction mixture R) into a mold,
iii) foaming the reaction mixture R) and
iv) demolding the rigid PUR/PIR foam.

DETAILED DESCRIPTION

Terms used in the present application are defined as follows:

The isocyanate index (also known as the index) is to be understood as meaning the quotient of the actually employed amount of substance [mol] of isocyanate groups and the actually employed amount of substance [mol] of isocyanate-reactive groups, multiplied by 100:

Index=(mols of isocyanate groups/mols of isocyanate-reactive groups)*100.

In the context of the present application the "functionality" or "f" of a component mixture is to be understood as meaning the respective number-average functionality of the mixture to which the indication refers. Thus for example the functionality of the polyol component A1) is to be understood as meaning the number-average functionality of the mixture of the polyols present in the component A1 based on all isocyanate-reactive functions present.

In the context of the present application "molar weight" or "molar mass" or "$M_n$" is in each case to be understood as meaning the number-weighted average molar mass.

In the case of a single added polyol the OH number (also known as hydroxyl number) specifies the OH number of said polyol. Reported OH numbers for mixtures relate to the number-average OH number of the mixture calculated from the OH numbers of the individual components in their respective molar proportions. The OH number specifies the amount of potassium hydroxide in milligrams which is equivalent in an acetylation to the acetic acid quantity bound by one gram of substance. In the context of the present invention said number is determined according to the standard DIN 53240-2 (as at November 2007).

The isocyanate-reactive component A) contains at least one polyol component A1) selected from the group consisting of polyether polyols, polyester polyols, polyether ester polyols, polycarbonate polyols and polyether polycarbonate polyols.

The proportion of primary OH functions based on the total number of terminal OH functions of all polyols employed in the component A) is at least 30%, preferably at least 35%, especially preferably at least 38%.

The polyol component A1) has the further feature that it has a functionality f of >2.5, preferably ≥2.6-≤6.5 and particularly preferably ≥2.8-≤6.1. Polyol formulations in which the polyol component A1) has a functionality in these ranges provide an optimal viscosity increase until decompression of the counterpressure during injection and allow faster demolding of the foams.

The polyol component A1) preferably has a hydroxyl number of 280-600 mg KOH/g, particularly preferably of 300-580 mg KOH/g and especially preferably of 350-540 mg KOH/g. This has a particularly advantageous effect on the mechanical properties of the foams.

In the context of the present application "a polyether polyol" may also be a mixture of different polyether polyols, this also applying analogously to the other polyols recited here.

The polyether polyols employable according to the invention are the polyether polyols employable in polyurethane synthesis and known to those skilled in the art.

Employable polyether polyols are for example polytetramethylene glycol polyethers such as are obtainable by polymerization of tetrahydrofuran by cationic ring opening.

Likewise suitable polyether polyols are addition products of styrene oxide, ethylene oxide, propylene oxide, butylene oxide and/or epichlorohydrin onto di- or polyfunctional starter molecules. The addition of ethylene oxide and propylene oxide is especially preferred. Suitable starter molecules are for example water, ethylene glycol, diethylene glycol, butyl diglycol, glycerol, diethylene glycol, trimethylolpropane, propylene glycol, pentaerythritol, sorbitol, sucrose, ethylenediamine, toluenediamine, triethanolamine, bisphenols, in particular 4,4'-methylenebisphenol, 4,4'-(1-methylethylidene)bisphenol, 1,4-butanediol, 1,6-hexanediol and low molecular weight hydroxyl-containing esters of such polyols with dicarboxylic acids and oligoethers of such polyols.

It is preferable when based on its total weight the isocyanate-reactive component A) contains at least 50% by weight, preferably at least 60% by weight, especially preferably at least 70% by weight, of polyether polyol. In a preferred embodiment the component A1) consists of polyether polyol to an extent of 100% by weight. These preferred embodiments feature particularly good hydrolysis stability.

Employable polyether ester polyols are compounds containing ether groups, ester groups and OH groups. Organic dicarboxylic acids having up to 12 carbon atoms are suitable for producing the polyether ester polyols, preferably aliphatic dicarboxylic acids having ≥4 to ≤6 carbon atoms or aromatic dicarboxylic acids used singly or in admixture. Examples include suberic acid, azelaic acid, decanedicarboxylic acid, maleic acid, malonic acid, phthalic acid, pimelic acid and sebacic acid and in particular glutaric acid, fumaric acid, succinic acid, adipic acid, phthalic acid, terephthalic acid and isoterephthalic acid. Also employable in addition to organic dicarboxylic acids are derivatives of these acids, for example their anhydrides and also their esters and monoesters with low molecular weight monofunctional alcohols having ≥1 to ≤4 carbon atoms. The use of proportions of the abovementioned bio-based starting materials, in particular of fatty acids/fatty acid derivatives (oleic acid, soybean oil etc.), is likewise possible and can have advantages, for example in respect of storage stability of the polyol formulation, dimensional stability, fire characteristics and compressive strength of the foams.

Polyether polyols obtained by alkoxylation of starter molecules such as polyhydric alcohols are a further component used for producing polyether ester polyols. The starter molecules are at least difunctional, but may optionally also contain proportions of higher-functional, in particular trifunctional, starter molecules.

Starter molecules include for example diols having number-average molecular weights Mn of preferably ≥18 g/mol to ≤400 g/mol, preferably of ≥62 g/mol to ≤200 g/mol, such as 1,2-ethanediol, 1,3-propanediol, 1,2-propanediol, 1,4-butanediol, 1,5-pentenediol, 1,5-pentanediol, neopentyl glycol, 1,6-hexanediol, 1,7-heptanediol, 1,8-octanediol, 1,10-decanediol, 2-methyl-1,3-propanediol, 2,2-dimethyl-1,3-propanediol, 3-methyl-1,5-pentanediol, 2-butyl-2-ethyl-1,3-propanediol, 2-butene-1,4-diol and 2-butyne-1,4-diol, ether diols such as diethylene glycol, triethylene glycol, tetraethylene glycol, dibutylene glycol, tributylene glycol, tetrabutylene glycol, dihexylene glycol, trihexylene glycol, tetrahexylene glycol and oligomeric mixtures of alkylene glycols, such as diethylene glycol. Starter molecules having functionalities distinct from OH may also be employed alone or in admixture.

In addition to the diols compounds having >2 Zerewitinoff-active hydrogens, in particular having number-average functionalities of >2 to ≤8, in particular of ≥3 to ≤6, may also be co-used as starter molecules for producing the polyethers, for example 1,1,1-trimethylolpropane, triethanolamine, glycerol, sorbitan and pentaerythritol and also triol- or tetraol-started polyethylene oxide polyols having average molar masses Mn of preferably ≥62 g/mol to ≤400 g/mol, in particular of ≥92 g/mol to ≤200 g/mol.

Polyether ester polyols may also be produced by alkoxylation, in particular by ethoxylation and/or propoxylation, of reaction products obtained by the reaction of organic dicarboxylic acids and their derivatives and components with Zerewitinoff-active hydrogens, in particular diols and polyols. Derivatives of these acids that may be used include, for example, their anhydrides, for example phthalic anhydride.

Suitable polyester polyols are inter alia polycondensates of di- and also tri- and tetraols and di- and also tri- and tetracarboxylic acids or hydroxycarboxylic acids or lactones. Also employable instead of the free polycarboxylic acids are the corresponding polycarboxylic anhydrides or corresponding polycarboxylic esters of lower alcohols to prepare the polyesters.

Examples of suitable diols are ethylene glycol, butylene glycol, diethylene glycol, triethylene glycol, polyalkylene glycols such as polyethylene glycols and also 1,2-propanediol, 1,3-propanediol, 1,3-butanediol, 1,4-butanediol, 1,6-hexanediol and isomers, neopentyl glycol or neopentyl glycol hydroxypivalate. Also employable in addition are polyols such as trimethylolpropane, glycerol, erythritol, pentaerythritol, trimethylolbenzene or trishydroxyethyl isocyanurate.

Additional co-use of monohydric alkanols is also possible.

Examples of polycarboxylic acids that may be used include phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, or trimellitic acid. It is also possible to use the corresponding anhydrides as an acid source.

Additional co-use of monocarboxylic acids such as benzoic acid and alkanecarboxylic acids is also possible.

Hydroxycarboxylic acids that may be co-used as co-reactants in the production of a polyester polyol having terminal hydroxyl groups include for example hydroxycaproic acid, hydroxybutyric acid, hydroxydecanoic acid, hydroxystearic acid and the like. Suitable lactones include caprolactone, butyrolactone and homologs.

Suitable compounds for producing the polyester polyols also include in particular bio-based starting materials and/or derivatives thereof, for example castor oil, polyhydroxy fatty acids, ricinoleic acid, hydroxyl-modified oils, grapeseed oil, black cumin oil, pumpkin kernel oil, borage seed oil, soybean oil, wheat germ oil, rapeseed oil, sunflower kernel oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, fatty acids, hydroxyl-modified fatty acids and epoxidized fatty acids and fatty acid esters, for example based on myristoleic acid, palmitoleic acid, oleic acid, vaccenic acid, petroselic acid, gadoleic acid, erucic acid, nervonic acid, linoleic acid, alpha- and gamma-linolenic acid, stearidonic acid, arachidonic acid, timnodonic acid, clupanodonic acid and cervonic acid. Especially preferred are esters of ricinoleic acid with polyfunctional alcohols, for example glycerol. Also preferred is the use of mixtures of such bio-based acids with other carboxylic acids, for example phthalic acids.

Polycarbonate polyols that may be used are hydroxyl-containing polycarbonates, for example polycarbonate diols. These are obtainable by reaction of carbonic acid derivatives, such as diphenyl carbonate, dimethyl carbonate or phosgene, with polyols, preferably diols, or by copolymerization of alkylene oxides, for example propylene oxide, with $CO_2$.

Examples of such diols include ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethylpentane-1,3-diol, dipropylene glycol, polypropylene glycols, dibutylene glycol, polybutylene glycols, bisphenol A, and lactone-modified diols of the abovementioned type.

Also employable instead of or in addition to pure polycarbonate diols are polyether-polycarbonate diols obtainable for example by copolymerization of alkylene oxides, such as for example propylene oxide, with $CO_2$.

Production processes of the polyols are described for example by Ionescu in "Chemistry and Technology of Polyols for Polyurethanes", Rapra Technology Limited, Shawbury 2005, p. 55 et seq. (chapt. 4: Oligo-polyols for Elastic Polyurethanes), p. 263 et seq. (chapt. 8: Polyester Polyols for Elastic Polyurethanes) and in particular to p.321 et seq. (chapt. 13: Polyether Polyols for Rigid Polyurethane Foams) and p.419 et seq. (chapt. 16: Polyester Polyols for Rigid Polyurethane Foams). It is also possible to obtain polyester and polyether polyols by glycolysis of suitable polymer recyclates. Suitable polyether-polycarbonate polyols and the production thereof are described for example in EP 2910585 A, [0024]-[0041].Examples of polycarbonate polyols and production thereof may be found inter alia in EP 1359177 A. Production of suitable polyether ester polyols is described inter alia in WO 2010/043624 A and in EP 1 923 417 A.

Polyether polyols, polyethercarbonate polyols and polyether ester polyols having a high proportion of primary OH functions are obtained when the alkylene oxides used for alkoxylation comprise a high proportion of ethylene oxide. The molar proportion of ethylene oxide structures based on the entirety of the alkylene oxide structures present in the polyols of the component A1 is at least 50 mol %. The use of 100 mol % of ethylene oxide is likewise a preferred embodiment.

The isocyanate-reactive component A) may further contain low molecular weight isocyanate-reactive compounds A2), in particular di- or trifunctional amines and alcohols, particularly preferably diols and/or triols having molar masses $M_n$ of less than 400 g/mol, preferably of 60 to 300 g/mol, for example triethanolamine, diethylene glycol, ethylene glycol, glycerol, may be employed. Provided such low molecular weight isocyanate-reactive compounds are used for producing the rigid polyurethane foams, for example as chain extenders and/or crosslinking agents, and these do not also fall under the definition of component A1), they are advantageously employed in an amount of up to 5% by weight based on the total weight of the component A).

In addition to the above-described polyols and isocyanate-reactive compounds the component A) may contain further isocyanate-reactive compounds A3), for example graft polyols, polyamines, polyamino alcohols and polythiols. It will be appreciated that the described isocyanate-reactive components also comprise compounds having mixed functionalities.

A preferred isocyanate-reactive component A) consists to an extent of at least 65% by weight, in particular at least 80% by weight and very particularly preferably to an extent of at least 90% by weight of the polyol component A1) which has a hydroxyl number between 280 to 600 mg KOH/g and a functionality of ≥2.8 to ≤6.0, and the proportion of primary OH functions in the component A) is at least 35% (based on all terminal OH functions in the component A).

The polyol formulation P) contains assistant and additive substances E). The assistant and additive substances comprise at least one or more cell-opening compounds. Cell-opening compounds are described for example in Kunststoff-Handbuch, volume 7, Polyurethane, Carl Hanser Verlag, Munich/Vienna, 3rd edition, 1993, pages 104-127. These are for example silicones, such as polyether-polydimethylsiloxane copolymers, or organic polymers, for example those based on polybutadiene (for example Ortegol 500 and 501 from Evonik Industries), surfactants, for example the sodium salt of ethoxylated and sulphated isotridecyl alcohol obtainable under the trade name Sermul EA266 (Elementis Specialties, the Netherlands) and mixtures of different components, for example mixtures of amine-stabilized, macromolecular, unsaturated hydrocarbons and phthalic esters. Cell openers based on polybutadiene are preferred. The cell-opening components are preferably employed in amounts of not more than 1% by weight based on the isocyanate-reactive component A). It is very particularly preferable to employ 0.1-1.0% by weight of an organic polymer based on polybutadiene, very particularly preferably 0.25-0.75% by weight, in each case based on the total weight of the component A).

Further assistant and additive substances E) that may be employed in the process according to the invention are the customary assistant and additive substances known from the prior art and to the person skilled in the art. These include for example surface-active substances, stabilizers, in particular foam stabilizers, cell regulators, fillers, dyes, pigments, flame retardants, antistats, antihydrolysis agents and/or fungistatic and bacteriostatic substances.

Some of the known cell-opening compounds, for example the silicones, may simultaneously also assume functions as surface-active substances, stabilizers or cell regulators. In this case these components may also be employed in amounts higher than the preferred amounts recited above for the cell-opening compounds.

Polyether-polydimethylsiloxane copolymers, preferably a polyethylene oxide polyether having oligodimethylsiloxane end groups, are often employed, wherein the number of dimethyl siloxane units is preferably ≤5.

Employable stabilizers are also saturated and unsaturated hydrocarbons such as paraffins, polybutadienes, fatty alcohols and esters, for example esters of carboxylic acids.

The component A) preferably contains in total not more than 3% by weight of silicones and polybutadienes.

Also employable as stabilizers are surfactants, for example alkoxylated alkanols such as ethers of linear or branched alkanols having ≥6 to ≤30 carbon atoms with polyalkylene glycols having ≥5 to ≤100 alkylene oxide units, alkoxylated alkylphenols, alkoxylated fatty acids, carboxylic esters of an alkoxylated sorbitan (especially Polysorbate 80), fatty acid esters, polyalkyleneamines, alkyl sulfates, phosphatidylinositols, fluorinated surfactants, surfactants comprising polysiloxane groups and/or bis(2-ethyl-1-hexyl) sulfosuccinate. Fluorinated surfactants may be perfluorinated or partially fluorinated. Examples thereof are partially fluorinated ethoxylated alkanols or carboxylic acids.

The component A) preferably contains a total of not more than 5% by weight of surfactants, especially preferably not more than 3% by weight, more preferably less than 2% by weight and especially preferably not more than 1.6% by weight of surfactants based on the total weight of the component A).

Catalysts D) are employed for the production of the rigid PUR/PIR foam. Typically employed as catalysts D) are compounds which accelerate the reaction of hydroxyl group-containing/isocyanate-reactive group-containing compounds of the components with the isocyanate groups of the component B.

The catalysts D) contain D1) at least one catalytically active amine compound having functional groups which comprise Zerewitinoff-active hydrogens and can therefore react with isocyanate (so-called "incorporable catalysts"). Examples of employable incorporable catalysts are for example bis(dimethylaminopropyl)urea, bis(N,N-dimethylaminoethoxyethyl)carbamate, dimethylaminopropylurea, N,N,N-trimethyl-N-hydroxyethylbis(aminopropyl ether), N,N,N-trimethyl-N-hydroxyethylbis(aminoethyl ether), diethylethanolamine, bis(N,N-dimethyl-3-aminopropyl) amine, dimethylaminopropylamine, 3-dimethyaminopropyl-N,N-dimethylpropane-1,3-diamine, dimethyl-2-(2-aminoethoxyethanol) and (1,3-bis(dimethylamino)propan-2-ol), N,N-bis(3-dimethylaminopropyl)-N-isopropanolamine, bis(dimethylaminopropyl)-2-hydroxyethylamine, N,N,N-trimethyl-N-3-aminopropylbis(aminoethyl ether), 3-dimethylaminoisopropyldiisopropanolamine or mixtures thereof.

In a preferred embodiment the catalysts D1) are employed in an amount of ≥0.01% to <2% by weight based on the total weight of the component A).

Also employable are one or more further catalyst compounds D2), especially the catalytically active compounds known for PUR/PIR chemistry, including not only further amine compounds but also salts such as for example tin(II) acetate, tin(II) octoate, tin(II) ethylhexoate, tin(II) laurate, dibutyltin diacetate, dibutyltin dilaurate, dibutyltin maleate, dioctyltin diacetate, tris(N,N-dimethylaminopropyl)-s-hexahydrotriazine, tetramethylammonium hydroxide, sodium acetate, sodium octoate, potassium acetate, potassium octoate, sodium hydroxide.

The catalysts D) are generally employed in an amount from 0.001 to 5% by weight, in particular from 0.05 to 2.5% by weight, based on the weight of the component A. It is particularly preferable when the catalysts D) contain both incorporable catalysts D1) and non-incorporable catalysts D2). It is especially preferable when incorporable amine compounds and catalytically active salts are employed in combination.

The catalysts D1 and D2 are preferably employed in a molar ratio D1/D2 of 0.1 to 16.3, particularly preferably of 0.3 to 10 and very particularly preferably of 0.8 to 6.0. It is preferable when the catalyst component D) contains as the catalytically active compound D1) an amine compound incorporable into the polyurethane and also the non-catalytically active compound D2) which is a catalytically active salt not incorporable into the polyurethane and the molar ratio of D1/D2 is 0.1 to 16.3, particularly preferably from 0.3 to 10 and very particularly preferably from 0.8 to 6.0. In a particularly preferred embodiment 3-(dimethylamino)propylurea and potassium acetate are employed in a molar ratio D1/D2 of 0.1 to 6.0, particularly preferably of 0.3 to 10 and very particularly preferably of 0.8 to 6.0. The preferred catalyst ratios/catalysts particularly advantageously bring about a defined viscosity increase.

Production of the rigid PUR/PIR foam employs supercritical $CO_2$ as blowing agent component C). This is employed in an amount necessary for achieving a dimensionally stable foam matrix and the desired apparent density. This is generally 0.5-30 parts by weight of blowing agent based on 100 parts by weight of the component A. Physical blowing agents may be employed as additional blowing agents. In the context of the present invention "physical blowing agents" are to be understood as meaning compounds which on account of their physical properties are volatile and unreactive toward the isocyanate component.

The additional physical blowing agents can be selected from the group of hydrocarbons (for example n-pentane, isopentane, cyclopentane, butane, isobutane, propane), ethers (for example methylal), halogenated ethers, perfluorinated and partially fluorinated hydrocarbons having 1 to 8 carbon atoms, for example perfluorohexane, HFC 245fa (1,1,1,3,3-pentafluoropropane), HFC 365mfc (1,1,1,3,3-pentafluorobutane), HFC 134a or mixtures thereof are used, and also (hydro)fluorinated olefins, for example HFO 1233zd(E) (trans-1-chloro-3,3,3-trifluoro-1-propene) or HFO 1336mzz(Z) (cis-1,1,1,4,4,4-hexafluoro-2-butene) or additives such as FA 188 from 3M (1,1,1,2,3,4,5,5,5-nonafluoro-4-(trifluoromethyl)pent-2-ene), and also mixtures thereof with one another.

The $CO_2$ as physical blowing agent is used in the supercritical or near critical state. Conditions are near-critical in the context of the present invention when the following condition is satisfied: $(T_c-T)/T \leq 0.4$ and/or $(p_c-p)/p \leq 0.4$. Here, T is the temperature prevailing in the process, Tc is the critical temperature of the blowing agent or blowing agent mixture, p is the pressure prevailing in the process and pc is the critical pressure for the blowing agent or blowing agent mixture. Conditions are preferably near-critical when: $(T_c-T)/T \leq 0.3$ and/or $(p_c-p)/p \leq 0.3$ and particularly preferably $(T_c-T)/T \leq 0.2$ and/or $(p_c-p)/p \leq 0.2$.

Particularly suitable conditions for performing the process according to the invention when using $CO_2$ are pressures and temperatures above the critical point of $CO_2$, i.e. $\geq 73.7$ bar and $\geq 30.9°$ C., preferably between 74 bar and 350 bar and between 31° C. and 100° C., particularly preferably between 75 bar and 200 bar and between 32° C. and 60° C.

When further blowing agents are added the blowing agent mixture preferably contains more than 60% by weight of carbon dioxide, particularly preferably more than 75% by weight, in one embodiment.

Also employable in addition to or else instead of the physical blowing agents added to the $CO_2$ are chemical blowing agents (also known as "co-blowing agents"). These are particularly preferably water and/or formic acid. The co-blowing agents are preferably employed in an amount of 0 to 6% by weight, particularly preferably of 0.5 to 4% by weight, based on the total amount of compounds having isocyanate-reactive hydrogen atoms in the foam-forming reaction mixture R).

The proportion of blowing agent C) in the mixture of the components A), C), D) and E) is $\geq 1\%$ by weight to $\leq 30\%$ by weight, preferably $\geq 4\%$ by weight to $\leq 20\%$ by weight, particularly preferably $\geq 6\%$ by weight to $\leq 16\%$ by weight; the proportion of the blowing agent in the foam-forming reaction mixture R) is 0.5% by weight to 15% by weight, preferably 2% by weight to 10% by weight, particularly preferably $\geq 3\%$ by weight to $\leq 8\%$ by weight.

The component B) is a polyisocyanate, i.e. an isocyanate having an NCO functionality of $\geq 2$. Examples of such suitable polyisocyanates include 1,4-butylene diisocyanate, 1,5-pentane diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or their mixtures of any desired isomer content, 1,4-cyclohexylene diisocyanate, 1,4-phenylene diisocyanate, 2,4- and/or 2,6-tolylene diisocyanate (TDI), 1,5-naphthylene diisocyanate, 2,2'-and/or 2,4'- and/or 4,4'-diphenylmethane diisocyanate (MDI) and/or higher homologs, 1,3- and/or 1,4-bis(2-isocyanatoprop-2-yl)benzene (TMXDI), 1,3-bis(isocyanatomethyl)benzene (XDI) and also alkyl 2,6-diisocyanatohexanoates (lysine diisocyanates) having C1 to C6-alkyl groups.

Preferably employed as the isocyanate component B) are mixtures of the isomers of diphenylmethane diisocyanate ("monomeric MDI", "mMDI" for short) and oligomers thereof ("oligomeric MDI"). Mixtures of monomeric MDI and oligomeric MDI are generally described as "polymeric MDI" (pMDI). The oligomers of MDI are higher-nuclear polyphenylpolymethylene polyisocyanates, i.e. mixtures of the higher-nuclear homologs of diphenylmethylene diisocyanate which have an NCO functionality f>2 and have the following structural formula: $C_{15}H_{10}N_2O_2$ $[C_8H_5NO]_n$, wherein n=integer>0, preferably n=1, 2, 3 and 4. Higher-nuclear homologs $C_{15}H_{10}N_2O_2$ $[C_8H_5NO]_m$, m=integer $\geq 4$) may likewise be present in the mixture of organic polyisocyanates a). Likewise preferred as the isocyanate component B) are mixtures of mMDI and/or pMDI comprising at most up to 20% by weight, more preferably at most 10% by weight, of further aliphatic, cycloaliphatic and especially aromatic polyisocyanates known for the production of polyurethanes, very particularly TDI.

In addition to the abovementioned polyisocyanates it is also possible to co-use proportions of modified diisocyanates having a uretdione, isocyanurate, urethane, carbodiimide, uretonimine, allophanate, biuret, amide, iminooxadiazinedione and/or oxadiazinetrione structure and also unmodified polyisocyanate having more than 2 NCO groups per molecule, for example 4-isocyanatomethyl-1,8-octane diisocyanate (nonane triisocyanate) or triphenylmethane 4,4',4"-triisocyanate.

Also employable instead of or in addition to the abovementioned polyisocyanates as the organic isocyanate component B) are suitable NCO prepolymers. The prepolymers are producible by reaction of one or more polyisocyanates with one or more polyols corresponding to the polyols described under the components A1) and A2).

The isocyanate may be a prepolymer obtainable by reacting an isocyanate having an NCO functionality of ≥2 and polyols having a molecular weight of ≥62 g/mol to ≤8000 g/mol and OH functionalities of ≥1.5 to <6.

The NCO content is preferably from ≥29.0% by weight to ≤32.0% by weight and preferably has a viscosity at 25° C. of ≥80 mPas to ≤2000 mPas, particularly preferably of ≥100 mPas to ≤800 mPas (dynamic viscosity determined according to DIN 53019 at 25° C.).

The number of NCO groups in the polyisocyanate component B) and the number of isocyanate-reactive groups in the component A) may be in a numerical ratio to one another of ≥50:100 to ≤500:100 for example. The rigid polyurethane foams are produced generally by reacting the components A) and B) in amounts such that the isocyanate index in the formulation is 80-150, preferably 90-130, particularly preferably 95-110. In this range urethane groups are preferably formed. In another preferred embodiment the isocyanate index is 150-400.In this range the foams comprise a high proportion of isocyanurate functions which bring about for example an inherent flame retardancy of the foams.

In step i) of the process according to the invention the foam-forming reaction mixture R) is produced from the components A)-E).

To this end the mixture comprising the components A), D), E) may be initially charged for example in a vessel, then mixed with the component C) and admixed with the polyisocyanate B). The mixing of the components may also be effected in a mixing head.

The mixing, in particular with the components C) and B), may be effected under pressure. In a preferred embodiment the components A), D), E) and C) are mixed with the component B) in a high-pressure mixing head.

The blowing agent component C) is $CO_2$ in the supercritical state and the reaction of the components is carried out under conditions supercritical for $CO_2$. In this case suitable pressures in the mixing head and/or in the discharge conduit/the discharge conduits for producing the polyurethane foam are for example in the range from ≥73.7 bar to ≥350 bar and preferably in the range from ≥75 bar to ≤200 bar. Suitable temperatures are for example ≥30.9° C. to ≤100° C. and preferably ≥32° C. to ≤60° C. At such pressures supercritical conditions for the employed blowing agent may be maintained.

In a further embodiment the residence time of the mixture in the mixing head under supercritical conditions for the blowing agent is ≥0 seconds to ≤20 seconds, preferably from ≥0.1 seconds to ≤10 seconds and particularly preferably from ≥0.5 seconds to ≤5 seconds. This has the result that the mixture can polymerize under supercritical conditions. The residence time may be determined by the volume of the reaction chamber (=mixing chamber and/or conduits) in which supercritical conditions prevail divided by the volume of the mixture conveyed in a particular unit time.

In step ii) of the process according to the invention the inventive foam-forming reaction mixture R) composed of the components A)-E) is introduced into a mold.

In a preferred embodiment the mold is a closed mold, wherein the counterpressure in the mold during injection is 2-90 bar, preferably 2-80 bar, particularly preferably 5-40 bar.

Possible embodiments therefor are as follows: The counterpressure is achieved by pressurizing the mold with gas (compressed air or nitrogen) either directly and/or via a floating seal, which divides the pressurized space into a gas space and a reaction space, and is established, held and finally decompressed via a proportional valve.

In step iii) of the process the reaction mixture is foamed.

In the case where the reaction mixture was injected into a mold under counterpressure a preferred embodiment of step iii) is as follows:

After termination of step ii) the pressure in the mold is kept constant for a period 1 which is preferably 1-40 seconds, particularly preferably 5-20 seconds and very particularly preferably 8-17 seconds, wherein the viscosity of the reaction mixture initially increases without foaming It has been found that holding the pressure for the preferred period results in particularly advantageous viscosity ranges of the mixture for this reaction section. Once the period 1 has elapsed the mold is decompressed. The releasing of the pressure from the mold is carried out over a period 2 at a pressure release rate of 1-90 bar/s, preferably 1-80 bar/s, particularly preferably 2-70 bar/s. The releasing may be effected in particular via a proportional valve. The reaction mixture is foamed over period 2. An excessively fast releasing has a negative effect on cell stability and excessively slow releasing has a negative effect on the foaming reaction.

In step iv) of the process the rigid PUR/PIR foam is demolded.

One particularly preferred embodiment of the process according to the invention comprises the steps of:
i) producing a foaming reaction mixture R) from
an isocyanate-reactive component A) containing at least one polyol component A1) selected from the group consisting of polyether polyols, polyester polyols, polycarbonate polyols, polyether polycarbonate polyols and polyether ester polyols which has an OH functionality F of >2.5,
at least one polyisocyanate component B),
at least one blowing agent C),
a catalyst component D) at least containing a catalytically active compound D1) having Zerewitinoff-active hydrogens,
assistant and additive substances E) at least comprising a cell-opening compound,
wherein the proportion of all primary OH functions present in the isocyanate-reactive component A) based on the total number of terminal OH functions in the component A) is at least 30%,
ii) introducing the foaming reaction mixture composed of component A), blowing agent and polysocyanate component B) into a closed mold, wherein the counterpressure in the mold during injection is 2-90 bar,
iii) holding the pressure in the mold for a period 1 of 1-40 s after termination of step ii) and subsequently releasing the pressure from the mold over a period 2 at a pressure release rate of 1-90 bar/s,
iv) demolding the rigid PUR/PIR foam.

The present invention further provides a rigid PUR/PIR foam obtainable or obtained by the process according to the invention.

The process according to the invention makes it possible to obtain rigid PUR/PIR foams having an apparent density of 30-90 kg/m$^3$, preferably 30-70 kg/m$^3$, which simultaneously have many open and particularly small cells. It is thus possible to produce rigid foams having an open-cell content of >90%, in particular >94%, where the cells exhibit an average diameter of <50 pa. The foams have good mechanical properties, for example good compressive strengths.

The PUR/PIR foams according to the invention make it possible in preferable fashion to produce foamed moldings and composite systems containing these moldings. The composite systems are often delimited both on the top surface and on the bottom surface by decorative layers. Suitable decorative layers include inter alia metals, plastics, wood and paper. Suitable fields of application of such discontinuously produced PUR/PIR composite systems include in particular industrial insulation of appliances such as refrigerators, chest freezers, fridge-freezers and boilers, cool containers and coolboxes and also of pipes.

The use of PUR/PIR foams in these fields is known per se to those skilled in the art and has already been described on many occasions. The PUR/PIR foams according to the invention are exceptionally suitable for these purposes since on account of their fine-cell content they feature low coefficients of thermal conductivity which can be still further enhanced by application of a vacuum.

The invention further relates to a refrigerator, a freezer or a fridge-freezer comprising a rigid PUR/PIR foam obtainable according to the invention, wherein the provided mold is in particular a housing part of the refrigerator, the freezer or the fridge-freezer. The invention shall be more particularly elucidated with reference to the examples and comparative examples which follow.

EXAMPLES

Employed Standards/Analytical Instruments:
Determination of apparent density: Foams composed of rubber and plastics—determination of apparent density (ISO 845:2006); German version EN ISO 845:2009
Determination of open-cell content: Determination of the volume fraction of open and closed cells (ISO 4590:2002); German version EN ISO 4590:2003
Determination of compressive strength: Rigid foams—determination of pressure properties (ISO 844:2014); German version EN ISO 844:2014
Determination of OH number: Determination of hydroxyl number—part 2: Method with catalyst according to DIN 53240-2, as at November 2007
Determination of cell size: Optical microscopy evaluation via VHX 5000 optical microscope; the test specimen to be measured is analyzed at 3 different points in each case over a circular region having a diameter of 5 mm. The resolution is chosen such that the selected region captures around 100 cells. 100 cells are then measured and the smallest and largest cell diameter as well as the average cell diameter are calculated.

The reported functionality f in table 1 relates to the number-average functionality of the mixture of the polyols present in the formulation The specified proportion of primary OH functions in 1%1 in table 1 relates to the proportion of primary OH functions based on the total number of OH functions in the mixture of the polyols present in the formulation.

Example 1 and Comparative Examples 2 and 3

Polyurethane foams blown with $CO_2$ and n-pentane were produced according to the formulations recited in table 1 which follows. Reported amounts are to be understood as meaning parts by weight unless otherwise stated. The following substances were employed:

Polyol 1: Polyether polyol based on trimethylolpropane and propylene oxide having a hydroxyl number of 800 mg KOH/g, a functionality of 3 and a viscosity of 6100 mPas at 25° C.

Polyol 2: Polyether polyol based on trimethylolpropane and ethylene oxide having a hydroxyl number of 550 mg KOH/g, a functionality of 3 and a viscosity of 505 mPas at 25° C.

Polyol 3: Polyether polyol based on trimethylolpropane and propylene oxide having a hydroxyl number of 550 mg KOH/g, a functionality of 3 and a viscosity of 1800 mPas at 25° C.

Polyol 4: Polyether polyol based on 1,2-propanediol and propylene oxide having a hydroxyl number of 56 mg KOH/g, a functionality of 2 and a viscosity of 310 mPas at 25° C.

Polyol 5: Polyether polyol based on 1,2-propanediol and propylene oxide having a hydroxyl number of 112 mg KOH/g, a functionality of 2 and a viscosity of 140 mPas at 25° C.

Polyol 6: Polyether polyol based on glycerol and propylene oxide having a hydroxyl number of 231 mg KOH/g, a functionality of 3 and a viscosity of 350 mPas at 20° C.

B 8443: Foam stabilizer (Evonik)
Ortegol 500: Cell opener (Evonik)
Desmorapid PU 1972: Catalyst, 25% potassium acetate in diethylene glycol (Covestro)
Dabco NE1070: Catalyst, 3-(dimethylamino)propylurea (Air Products)
n-Pentane: Blowing agent
Isocyanate: Mixture of monomeric and polymeric MDI having a viscosity of about 290 m Pa·s at 20° C. (Desmodur 44V20L, Covestro)

Production of Free-Rise Polyurethane Foams, Comparative Example 3

To produce free-rise polyurethane foams in the laboratory 200 g of a composition of the respective polyol formulation composed of the polyols, stabilizers and catalysts listed in table 1 below and also blowing agent was produced. To produce the reaction mixture this composition of polyol formulation and blowing agent was mixed with the corresponding amount of isocyanate for 10 seconds at 23° C. using a Pendraulik stirrer and poured out into an open-top mold (20 cm×20 cm×18 cm). The precise formulations are summarized in table 1 and the results of the properties of the reaction mixtures and of the physical tests on the foams are summarized in table 2.

Production of Molded Polyurethane Foams, Comparative Example 2

To produce molded polyurethane foams in the laboratory 100 g of a composition of the respective polyol formulation composed of the polyols, stabilizers and catalysts listed in table 1 below and also blowing agent was produced. To produce the reaction mixture this composition of polyol formulation and blowing agent was mixed with the corresponding amount of isocyanate for 10 seconds at 23° C. using a Pendraulik stirrer and poured out into a mold (20 cm×20 cm×6 cm). The mold was tightly sealed immediately after pouring. The molded article thus produced was demolded from the mold after 5 min. The precise formulations are summarized in table 1 and the results of the physical tests on the foams are summarized in table 2.

Production of Molded Polyurethane Foams in a High-Pressure Plant, Example 1

To produce free-rise polyurethane foams in a high-pressure plant a polyol formulation composed of the polyols, stabilizers and catalysts listed in table 1 was produced. This was employed as the polyol component in a standard high-pressure mixing plant and mixed with the blowing agent $CO_2$ at a pressure of 150 bar and a temperature of 50° C. The blowing agent was thus under supercritical conditions here. In a high-pressure mixing head this mixture was mixed with the isocyanate which was conveyed at a pressure of 150 bar and a temperature of 35° C. The shot quantity was 40 g/s corresponding to a volume flow of 48 ml/s (density of the mixture 1.2 g/ml). The thus-obtained reaction mixture was injected into a sealed mold (having a volume of 1 l) prestressed with a counterpressure of 10 bar at a mold temperature of 50° C. After termination of the injection the prestressed counterpressure of 10 bar was maintained for a further 12 s and only then decompressed to ambient pressure over <2 s. The thus-produced molded article was demolded from the mold after 5 min. The precise formulations are summarized in table 1 and the results of the physical tests on the foams are summarized in table 2.

TABLE 1

|  |  | Comparative Example 2 Molded foam | Example 1 Molded foam | Comparative Example 3 Frec-rise foam |
|---|---|---|---|---|
| Polyol 1 | [% by wt] | 13.00 | 13.00 | 13.00 |
| Polyol 2 | [% by wt] | 32.50 | 32.50 | — |
| Polyol 3 | [% by wt] | — | — | 32.50 |
| Polyol 4 | [% by wt] | 13.50 | 13.50 | 13.50 |
| Polyol 5 | [% by wt] | 9.50 | 9.50 | 9.50 |
| Polyol 6 | [% by wt] | 27.00 | 27.00 | 27.00 |
| B 8443 | [% by wt] | 1.00 | 1.00 | 1.50 |
| Ortegol 500 | [% by wt] | 0.13 | 0.13 | 0.50 |
| Desmorapid PU 1792 | [% by wt] | 1.00 | 1.00 | 1.00 |
| Dabco NE 1070 | [% by wt] | 0.65 | 0.65 | 0.65 |
| Functionality f |  | 2.9 | 2.9 | 2.9 |
| Proportion of primary OH functions [%] |  | 46.0 | 46.0 | 0.0 |
| Isocyanate | [% by wt] | 92.60 | 92.60 | 92.60 |
| n-Pentane | [% by wt] | 10.00 |  | 6.70 |
| scCO2 | [% by wt] |  | 5.00 |  |
| Index | NCO/OH | 100 00 | 100.00 | 100.00 |

TABLE 2

|  |  |  | Comparative example 2 | Example 1 | Comparative example 3 |
|---|---|---|---|---|---|
| Cream time | [s] |  | — | — | 50 |
| Fiber time | [s] |  | — | — | 87 |
| Rise time | [s] |  | — | — | 90 |
| Tack-free time | [s] |  | — | — | 95 |
| Apparent density | [kg/m3] |  | 61 | 67 | 63 |
| Compressive strength at 10% compression | [MPa] | parallel | 0.34 | not determined | 0.41 |
|  |  | transverse | 0.34 |  | 0.29 |
| Open cell content | [%] |  | 96.4 | 95.5 | 25.6 |
| Cell site average | μm |  | 83 | 17 | 126 |
| Cell size smallest cell | μm |  | 33 | 3 | 73 |
| Cell size largest cell | μm |  | 141 | 38 | 174 |

Example 1 shows that the specified formulation can be used to produce a very fine-celled rigid foam having a high proportion of open cells.

Example 1 shows clearly that processing of the formulation in a high-pressure plant with supercritical $CO_2$ as the blowing agent and 10 bar of counterpressure on the mold results in finer (than for example in comparison 2 with identical formulation), simultaneously open-celled rigid foams.

While substitution of polyol 2 by polyol 3 in comparative example 5 does make it possible to achieve the average cell size of 126 μm, the proportion of open cells is only 25.6%.

The invention claimed is:

1. A process for producing rigid PUR/PIR foams having an apparent density of 30-90 kg/m³ according to ISO 845: 2006, an open-cell content of >90% according to ISO 4590:2002, and having an average cell diameter of <50 μm according to optical microscopy evaluation, comprising the steps of
   i) producing reaction mixture R) comprising
      a polyol formulation P) comprising
         an isocyanate-reactive component A) comprising at least one polyol component A1) having a functionality of >2.5 comprising at least one of polyether polyols, polyester polyols, polycarbonate polyols, polyether polycarbonate polyols and polyether ester polyols,
         a catalyst component D) comprising a catalytically active compound D1) having Zerewitinoff-active hydrogens,
         an assistant or additive substance E) comprising a cell-opening compound,
         wherein a proportion of all primary OH functions present in the isocyanate-reactive component A) based on a total number of terminal OH functions in the component A) is at least 30%,
      a polyisocyanate component B) and
      $CO_2$ in the supercritical state as blowing agent component C),
   ii) introducing the reaction mixture R) into a mold,
   iii) foaming the reaction mixture R) and
   iv) demolding a rigid PUR/PIR foam formed from the reaction mixture R).

2. The process as claimed in claim 1, wherein step i) and ii) are carried out under supercritical conditions.

3. The process as claimed in claim 1, wherein step i) is carried out in a mixing head or high-pressure mixing head.

4. The process as claimed in claim 1, wherein in step ii) the reaction mixture R) is introduced into a sealed mold, wherein the counterpressure in the mold during injection is 2-90 bar.

5. The process as claimed in claim 4, wherein in step iii) the pressure in the mold is maintained for a time period 1 of 1-40 seconds after termination of step ii) and subsequently the pressure is released from the mold over a time period 2 at a pressure release rate of 1-90 bar/s.

6. The process as claimed in claim 1, wherein the polyol component A1) has a hydroxyl number of 280-600 mg KOH/g according to DIN 53240-2 (2007).

7. The process as claimed in claim 1, wherein the isocyanate-reactive component A) comprises at least 65% by weight of the polyol component A1) wherein the polyol component A1) has a hydroxyl number between 280 to 600 mg KOH/g and a functionality of ≥2.8 to ≤6.0 and the proportion of primary OH functions in the component A) is at least 35% based on all terminal OH functions in the component A).

8. The process as claimed in claim 1, wherein the isocyanate-reactive component A) comprises at least 60% by weight of polyether polyol.

9. The process as claimed in claim 1, wherein the content of cell-opening component E) is 0.1-1.0% by weight.

10. The process as claimed in claim 1, wherein the catalytically active compound D1) is included in an amount of ≥0.01% to <2% by weight based on the total weight of the component A).

11. The process as claimed in claim 1, wherein the content of blowing agent component C) is 0.5% by weight to 15% by weight based on the total weight of R).

12. An open-celled rigid PUR/PIR foam having an apparent density of 30-90 kg/$^3$ according to ISO 845:2006, an open-cell content of >90% according to ISO 4590:2002, and having an average cell diameter of <50 um according to optical microscopy evaluation obtainable by the process as claimed in claim 1.

13. A refrigerator, freezer or a fridge-freezer containing a rigid PUR/PIR foam as claimed in claim 12.

14. The process as claimed in claim 1, wherein after termination of step ii), the mold is decompressed at a pressure release rate of 1-90 bar/s.

\* \* \* \* \*